United States Patent [19]

Shindelar

[11] 4,330,985
[45] May 25, 1982

[54] MACHINE FOR ROLLING HAY INTO CYLINDRICAL BALES

[75] Inventor: Joseph J. Shindelar, Ottumwa, Iowa

[73] Assignee: Deere & Company, Moline, Ill.

[21] Appl. No.: 585,851

[22] Filed: Jun. 11, 1975

[51] Int. Cl.³ .............................................. A01D 75/00
[52] U.S. Cl. ...................................................... 56/341
[58] Field of Search .................................. 56/341–343, 56/1, 16.4

[56] References Cited

U.S. PATENT DOCUMENTS

| | | | |
|---|---|---|---|
| 3,057,139 | 10/1962 | Lane et al. | 56/341 |
| 3,164,211 | 1/1965 | Scott | 56/1 X |
| 3,763,636 | 10/1973 | Bliss | 56/341 |
| 3,797,215 | 3/1974 | Kopaska | 56/341 |
| 3,815,344 | 6/1974 | Kucera | 56/341 |

Primary Examiner—Jay N. Eskovitz

[57] ABSTRACT

A machine for rolling hay into cylindrical bales includes a mobile main frame with a rearwardly and upwardly swingable gate structure that raises to permit the discharge of a formed bale. An axially transverse finger type pickup is mounted on the lower end of the gate structure and raises the windrowed crop material as the machine advances to initially roll the crop material along the ground in advance of the pickup. A rear conveyor formed by a plurality of side by side belts trained around a roller on the axis of the pickup and another transverse roller above the pickup has an upwardly moving inner or forward run that engages the rear of the bale, the conveyor being swingable rearwardly to accommodate increasing bale size. A second belt type conveyor includes an axially transverse lower roller forwardly of the pickup and spaced above the ground so that the crop material passes beneath the forward conveyor. After a bale is rolled into a predetermined size by the pickup and the rear conveyor, it is engaged by the front conveyor, whereupon any increase in the bale size causes the bale to raise from the ground so that it is supported between the front and rear conveyors, whereby the bale is supported above the ground during the remainder of its formation.

4 Claims, 5 Drawing Figures

MACHINE FOR ROLLING HAY INTO CYLINDRICAL BALES

BACKGROUND OF THE INVENTION

This invention relates to a machine for forming hay into large cylindrical bales.

Although machines for rolling hay or the like into cylindrical bales have been known for considerable time, such machines have gained considerable popularity recently, the machine rolling the hay into relatively large bales of 1,000 pounds or more to eliminate some of the labor associated with handling the smaller or more conventional rectangular bales. Such cylindrical balers can be divided into two general types, namely machines that elevate the crop material from the ground and roll the hay into a bale while it is supported above the ground, and machines that simply roll the hay along the ground in snowball fashion, forming the bale on the ground. The former machines have the advantages of forming a tighter, more dense bale, which can be wrapped with twine after the bale is formed by feeding twine to the baling mechanism and continuing to rotate the bale while the machine is stationary. The twine wrapped bales, of course, are more durable. Also, in such machines, the bales can be transported in the machine after they are formed for discharge at any desired location. On the other hand, the ground rolling machines are generally simpler and consequently less expensive and easier to maintain. An example of the former type machine is shown in U.S. Pat. No. 3,722,197, while an example of the latter type machine is shown in U.S. Pat. No. 3,797,215.

SUMMARY OF THE INVENTION

According to the present invention, there is provided an improved machine for rolling hay into cylindrical balers that includes some of the advantages of both machines. More specifically, the improved machine initially rolls the bale upon the ground, but after the bale reaches a predetermined size, the bale is automatically raised so that it is supported above the ground during the remainder of its formation. The machine has the relative simplicity of many of the ground roll baling machines, while incorporating the advantages of the machines that form the bale above the ground, namely that the bale can be wrapped with twine by continuing to rotate the bale while the machine is stopped, in the known manner, and also that the bale can be transported in the machine after its formation for discharge at any desired location.

Another important feature of the invention resides in the provision of a simple mechanism for rolling the bale, and also in the provision of shields for eliminating the loss of material from the top of the baler while the bale is being formed, eliminating the necessity for enveloping the top of the bale in moving conveyors.

DESCRIPTION OF THE PREFERRED EMBODIMENT

Figure 1:
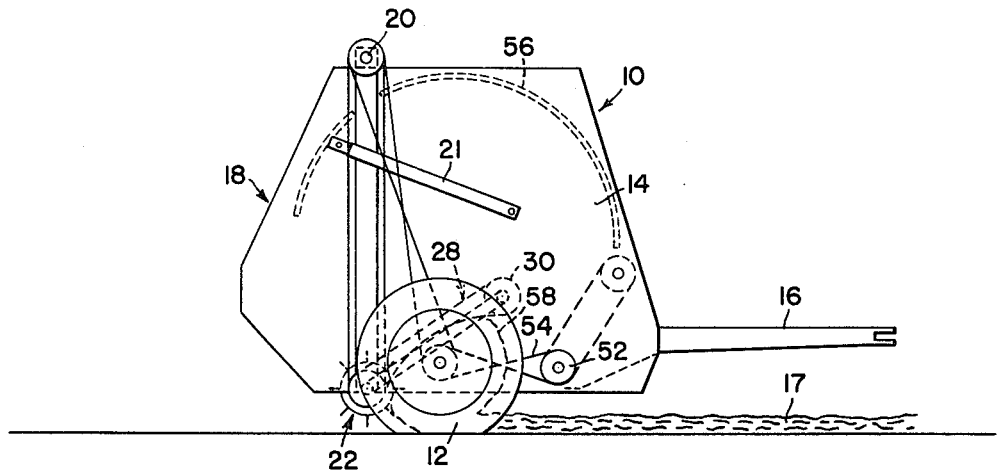
FIG. 1 is a schematic side elevation view of the bale during the initial formation of the bale on the ground.
Figure 4:
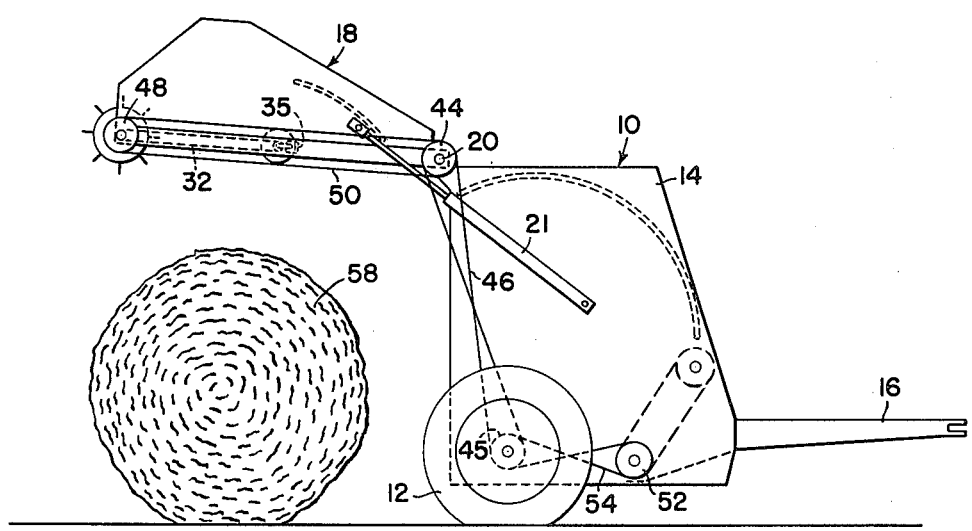
FIG. 4 is a view similar to FIGS. 1 and 2, but showing the bale after it has been discharged.
Figure 5:
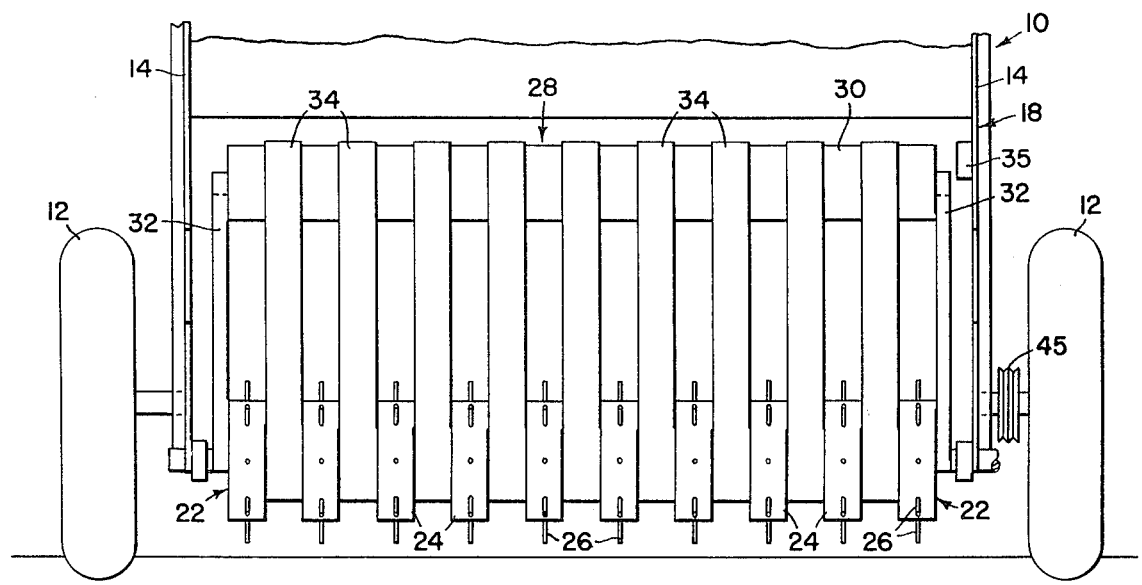
FIG. 5 is a schematic rear elevation view of the baler.

The improved hay baler includes a mobile main frame, indicated in its entirety by the numeral 10, the frame being mounted on a pair of laterally spaced wheels 12 outwardly of a pair of opposite, fore and aft, generally upright side walls 14, which are suitably interconnected by transverse frame elements (not shown). The frame is connected to a towing tractor or the like by means of a fore and aft tongue 16, that is preferably centrally located on the machine, so that the towing tractor and the baler straddle the windrowed crop material as the machine advances, the windrow being indicated by the numeral 17 in FIG. 1. The frame also includes a rear gate assembly 18 that is mounted on a transverse pivot 20 at the upper rear end of the machine, the rear gate assembly 18 being swingable rearwardly and upwardly about the pivot 20 from a lower operating position, as shown in FIG. 1, to a raised discharge position, as shown in FIG. 4, by means of a pair of hydraulic cylinders 21 respectively mounted on the opposite side walls and connected to the opposite side of the gate assembly 18. As is apparent, the rearward portions of the side walls 14 are part of the gate assembly, and the side walls are spaced apart approximately the width of the windrow, the bale being formed between the opposite side walls and substantially spanning the distance between the opposite walls, as is well known.

Mounted at the lower end of the gate assembly 18 and spanning the distance between the opposite side walls 14 is a rotary pickup mechanism 22, that is preferably of the well known disappearing finger type, such as is shown in U.S. Pat. No. 3,797,215, the pickup mechanism being schematically shown in the drawings. Such pickup mechanisms include a cylindrical drum 24 and a plurality of generally radially extending fingers 26, the ends of which sweep close to the ground as the drum 24 rotates to engage the crop laying in the windrow 17 and raise the crop from the ground, the fingers 26 substantially disappearing within the drum 24 to disengage the crop material from the top side of the drum.

A rear conveyor 28 is also mounted on the rear gate assembly and includes a transverse upper roller 30 that is journaled on the upper ends of a pair of arms 32, which are disposed immediately on the interior side of the opposite side walls 14 and are pivoted at their lower ends on the axis of the pickup mechanism. A plurality of side by side laterally spaced flat belts or conveyor elements 34 are trained around the roller 30 and the pickup drum 24, the pickup fingers being disposed in the space between the adjacent belts and the drum having circumferential groove in which the belts ride. The upper end of the rear conveyor 28 is swingable in an arc about the axis of the rotary pickup mechanism, and a stop 35 is provided on the rear gate to limit the downward or forward movement of the rear conveyor arms when it is selectively actuated. Normally the stop would not be actuated so that the rear conveyor would be free to swing about the rotary pickup mechanism axis, the stop only being actuated to limit the downward movement of the conveyor when the rear gate assembly is raised to its discharge position as shown in FIG. 4, so that the rear conveyor would not interfere with the discharge of the bale. An interconnection between the cylinders 21 and the stop 35 could be provided to automatically actuate the stop when the rear gate is raised.

A relatively short front conveyor 36 also spans the width of the machine between the opposite side walls 14 and includes axially transverse lower and upper rollers 38 and 40 respectively, the lower roller 38 being disposed ahead of the wheels and having an axis above the axis of the rotary pickup mechanism, so that the crop material passes below the lower roller 38 before it is engaged by the pickup mechanism. The front conveyor also includes a series of laterally spaced, side by side belts 42 trained around the rollers 38 and 40, although obviously, a single relatively wide belt could be used, or even a series of rollers.

The rotating elements are driven by a drive system from one of the wheels 12, so that the speed of the driven elements are coordinated with the ground speed, it being desirable that the linear speed of the conveyor belts approximate the ground speed for a proper formation of the bale. Of course, the different components could be driven from the tractor through some type of variable speed drive mechanism that would coordinate the speed of the driven elements with the ground speed. The drive system is schematically illustrated in the drawings and includes a double sheave 44 coaxially journaled on the axis of the pivot 20 and a similar double sheave 45 coaxially driven by a wheel 12. A drive belt 46 from one of the wheel sheaves drives the upper pair of sheaves 44 in a counterclockwise direction, as viewed in FIGS. 1 through 4. A sheave 48 is provided on the pickup mechanism 22 and a belt 50 interconnects one of the double sheaves 44 to the sheave 48, so that the pickup mechanism is also driven in a counterclockwise direction. An input sheave 52 is also provided on the lower conveyor roller 38 and is connected with the second of the wheel drive sheaves 45 via a belt 54, so that the lower roller 38 is also driven in a counterclockwise direction.

An arcuate downwardly concave shield 56 of generally semicylindrical shape spans the width of the machine between the opposite side walls 14, the front edge of the shield being spaced immediately above the upper roller 40 of the front conveyor, while the rear end of the shield is spaced immediately above the upper roller 30 of the rear conveyor when the conveyor is in its rearwardmost position. As is apparent, the shield substantially conforms to the shape of the top of a fully formed bale, and prevents the loss of material out the rear and out the top of the machine as the bale is being formed. The shield is formed in two sections, the front being attached to the main portion of the frame, while the rear is attached to the gate assembly. The rearward part of the shield could also be made shiftable with the rear conveyor so that it would limit the loss of material during the entire bale forming operation.

Figure 2:
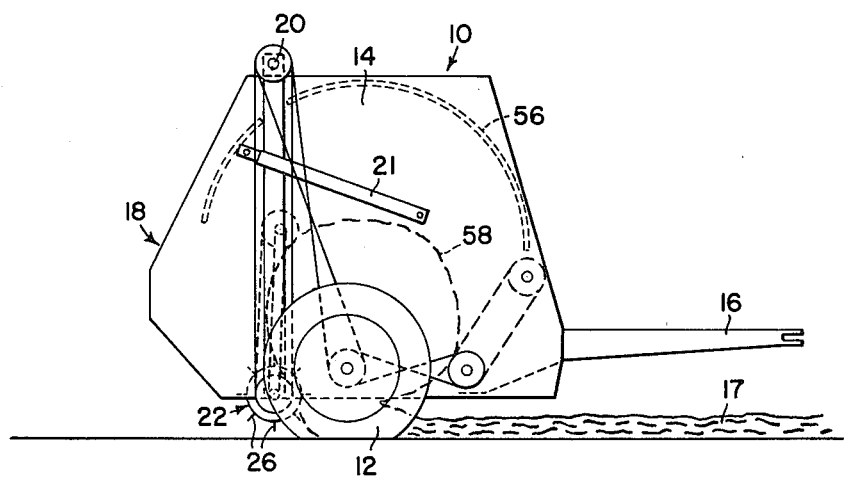
FIG. 2 is a view similar to FIG. 1, but showing the bale after it reaches a predetermined size as it is being raised from the ground.
Figure 3:
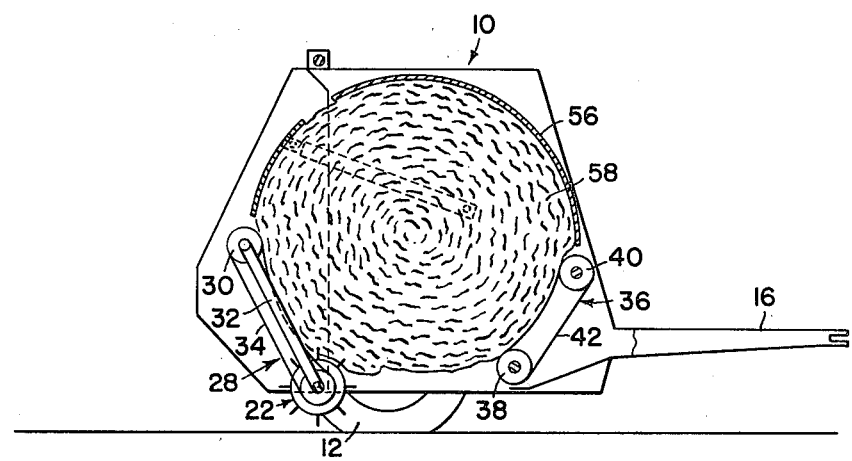
FIG. 3 is a sectional side elevation view showing the bale after it has reached full size.

In operation, the machine is towed over a field of windrowed crops, with the wheels 12 straddling the windrow. As the machine advances, the pickup mechanism 22 engages the crop lying on the ground and raises the crop, and as the crop is raised it is engaged by the belts 34 of the rear conveyor. When the bale is initially being formed, as shown in FIG. 1, the rear conveyor is inclined upwardly and forwardly, forming an angular pocket between the conveyor and the ground. As the crop material is fed into the pocket, it inherently tends to roll in snowball fashion into a spiral bale, as shown in FIG. 1 the bale being indicated by the numeral 58 in its various stages of completion shown in FIGS. 1-4. As the machine advances, and additional crop material is added to the rolling bale, the rear conveyor swings rearwardly, until it is in a substantially upright position when the bale reaches approximately half its eventual diameter, as shown in FIG. 2. At this point, the bale is of sufficient size that the front of the bale engages the rearward or inner run of the belts in the front conveyor 36 adjacent the lower conveyor roller 38. The inner or rearward run is moving downwardly and rearwardly and also tends to rotate the bale. As is apparent the forward end of the bale is then partially supported on the front conveyor, and also partially supported on the pickup mechanism at the lower end of the rear conveyor. Additional increase in the size of the bale causes the bale to automatically raise from the ground, so that it is no longer supported on the ground but carried by the machine. When the bale is fully formed, as shown in FIG. 3, it substantially fills the baling chamber between the opposite side walls and below the top shields 56, at which time the operator stops the machine. As is well known, a tieing mechanism can be provided for the bale to wrap twine around the bale while the bale is rotated in the machine without additional crop material being fed to the bale, following which the bale can either be carried to a desired location in the machine for discharge or discharged on the spot by actuating the cylinders 21 to swing the rear gate 18 upwardly and rearwardly, as shown in FIG. 4. As is apparent, when the rear gate is in its upper discharge position, it clears the bale, which, having lost its rearward support, falls off the front conveyor and drops onto the ground. The machine is then pulled forward, the gate assembly returned to its forward operating position, and formation of the next bale commences.

I claim:

1. A machine for removing crop material from the ground and rolling it into large cylindrical bales comprising: a mobile frame having generally vertical fore and aft extending sides, an axially transverse elevated pivot means, and a rear gate structure mounted on the pivot means for swinging between a lower operating position and a raised discharge position; means mounted on the frame for swinging the rear gate structure between its alternate positions; an axially transverse rotary pickup means journaled on the frame between the opposite frame sides and adapted to engage crop material and raise it from the ground as the machine advances; a first roller means journaled on the rear gate structure between the opposite sides, and associated with the pickup means; a second roller means extending between the opposite sides forwardly of the first roller means and spaced above the ground so that the crop material passes beneath the second roller means before engagement by the pickup means, the second roller means cooperating with the first roller means to support a bale above the ground after it reaches a size wherein the bale diameter is greater than the distance between the first and second roller means, the pickup means feeding the crop generally upwardly between the first and second roller means after the bale is supported on said roller means; a pair of arms having their lower ends swingably mounted on the frame for swinging about the axis of the first roller means; a third roller means journaled on and extending between the upper ends of said arms; conveyor means having a generally upwardly moving run between the first and third roller means, said upwardly moving run being inclined forwardly to engage the upper rear portion of a bale in the early stages of the bale formation, the arm means swinging rearwardly so that the upwardly moving run of said conveyor means is more vertical as the bale increases in size; a fourth roller means extending between the opposite frame sides generally above the level of the second roller means, said conveyor means including a downwardly moving run between the fourth and second roller means that supports the forward side of the bale as it is being formed off the ground; and drive means operatively connected to the pickup means and the conveyor means so that the pickup means feeds crop material generally upwardly into a baling chamber above the first and second roller means after the bale reaches a larger diameter than the distance between the first and second roller means, while the bale is being rotated by the conveyor means.

2. The invention defined in claim 1 wherein the conveyor means includes a rear conveyor formed by belt means trained around the first and third roller means and a second conveyor formed by belt means trained around the second and fourth conveyor means.

3. The invention defined in claim 2 and including an arcuate downwardly concave shield means having substantially the same curvature as a fully formed bale, the front of the shield means being disposed adjacent to and above the fourth roller means.

4. The invention defined in claim 3 wherein the first roller means is mounted on the rear frame structure concentrically with the rotary pickup means.

* * * * *